April 25, 1939.  R. GUNN  2,155,420
APPARATUS FOR THE DETECTION OF DISPLACEMENTS
Filed Dec. 4, 1936   3 Sheets-Sheet 1
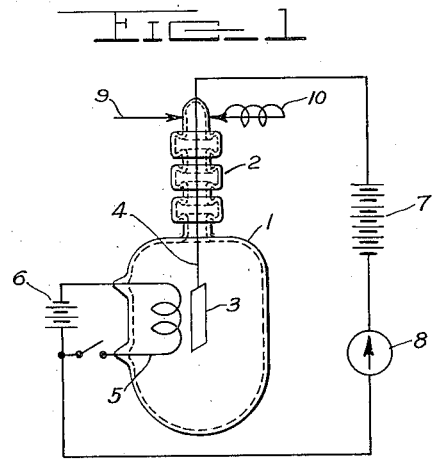
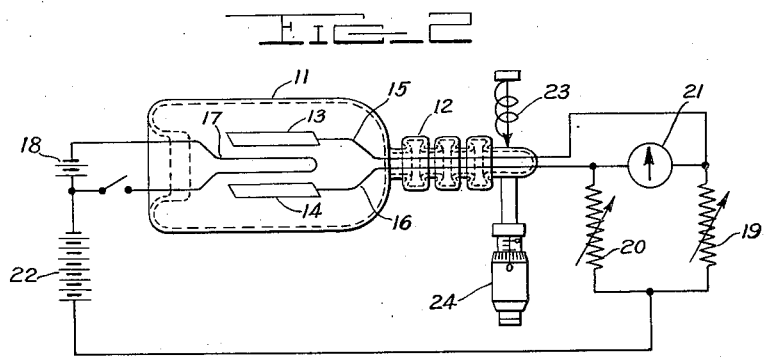
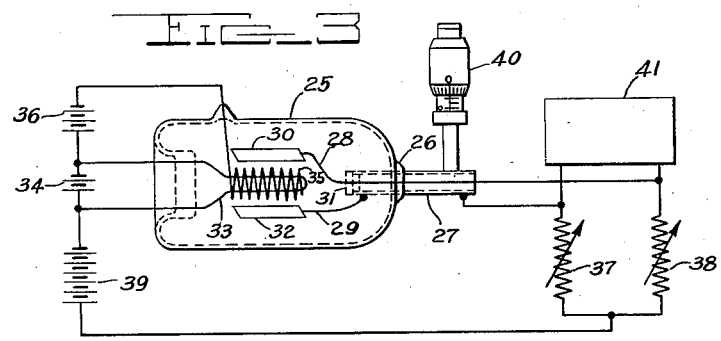
INVENTOR
Ross Gunn
BY
Robert A. Lavender
ATTORNEY April 25, 1939.  R. GUNN  2,155,420
APPARATUS FOR THE DETECTION OF DISPLACEMENTS
Filed Dec. 4, 1936  3 Sheets-Sheet 2
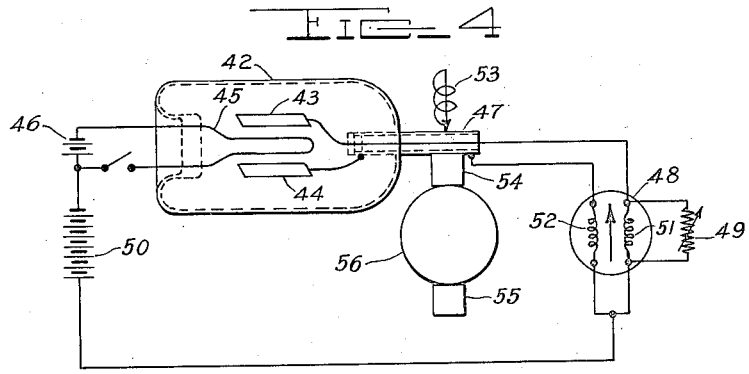
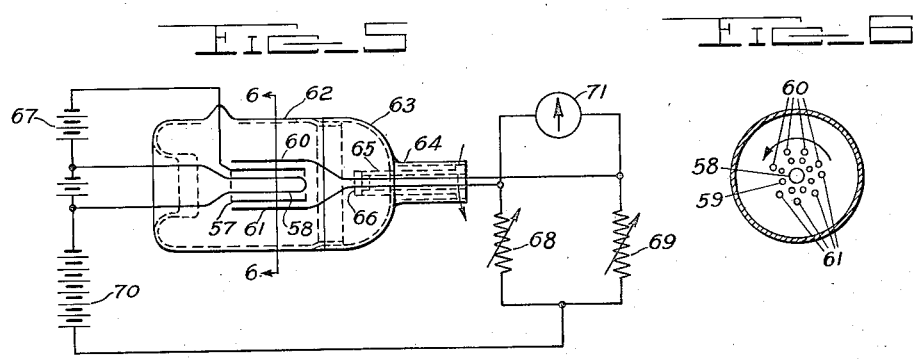
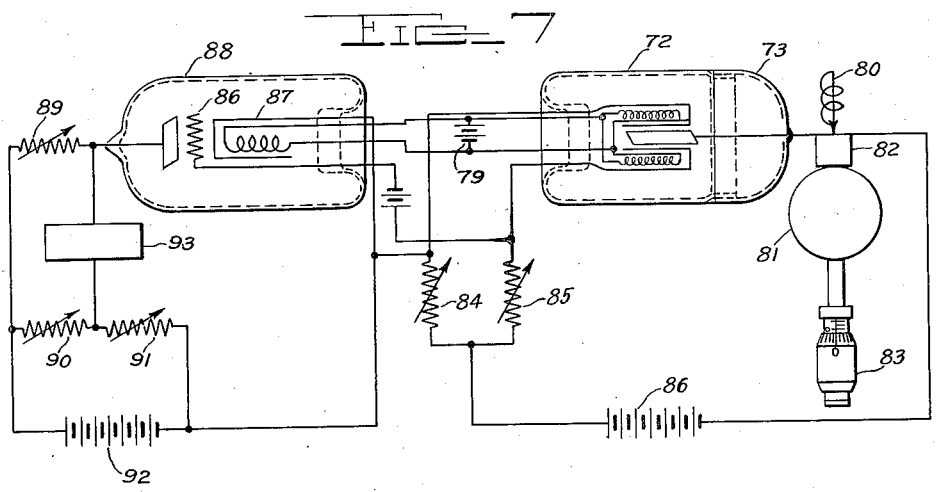
INVENTOR
*Ross Gunn*
BY
*Robert A. Lavender*
ATTORNEY April 25, 1939.   R. GUNN   2,155,420
APPARATUS FOR THE DETECTION OF DISPLACEMENTS
Filed Dec. 4, 1936   3 Sheets-Sheet 3
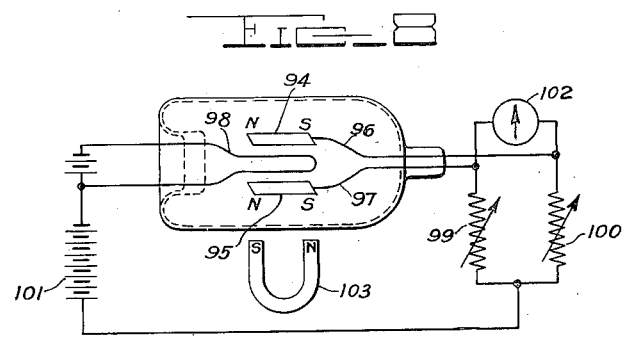
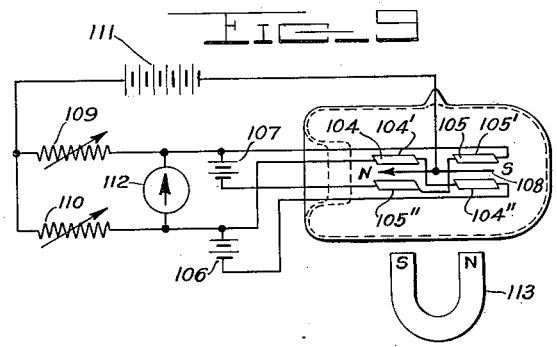
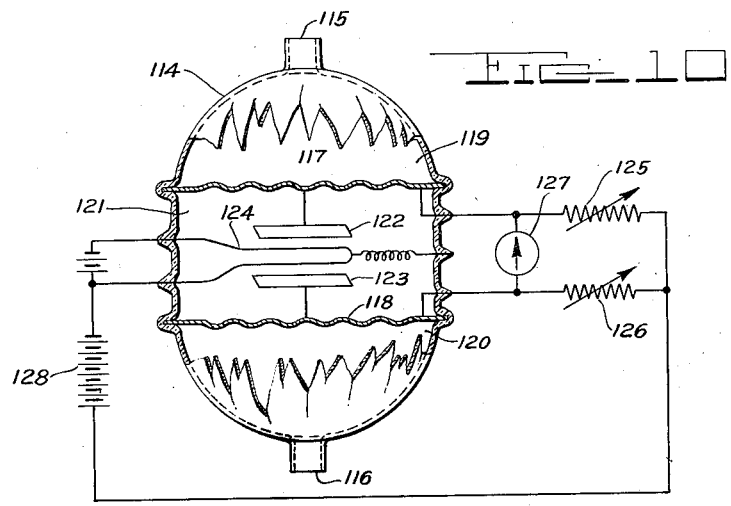
INVENTOR
Ross Gunn
BY
ATTORNEY Patented Apr. 25, 1939

2,155,420

UNITED STATES PATENT OFFICE 2,155,420

APPARATUS FOR THE DETECTION OF DISPLACEMENTS

Ross Gunn, Washington, D. C.

Application December 4, 1936, Serial No. 114,112

5 Claims. (Cl. 177—351)

REISSUED
FEB 27 1940

(Granted under the act of March 3, 1883, as amended April 30, 1928; 370 O. G. 757)

My invention relates to an apparatus for detecting displacements and more particularly to a simple, rugged and effective electrical apparatus for the remote and substantially instantaneous detection or measurement of mechanical displacements which may be either large or small in magnitude.

In carrying out my invention, I employ a space discharge device which includes at least a cathode and a movable anode and provide means responsive to the displacement to be detected or measured for imparting movement to the said anode. Any movement imparted to the anode results in a change in the average internal resistance between the anode and cathode with attendant change in the space current through the space discharge device. By connecting the space discharge device in a proper circuit and providing suitable indicating or recording means, a displacement of any desired character or magnitude may be detected or measured. Various types of novel space discharge devices and circuits may be advantageously employed in carrying my invention into effect all of which will be pointed out more in detail hereinafter.

The apparatus of my invention is capable of detecting or measuring high frequency periodic or non-periodic mechanical displacements, whose values closely approximate the wave length of red light and by the employment of suitable auxiliary means is readily adaptable to detecting or measuring displacements even to as great a value as a foot. Because of its simplicity, ruggedness, practicability and extreme sensitivity, my apparatus has a wide field of application. As illustrative of its many uses it may be employed for detecting or measuring mechanical or elastic vibrations such as occur in bridges, buildings, various machinery and other structures; for detecting or recording earthquakes, either natural or such as are produced as incidental to geo-physical exploration; for detecting or measuring elastic deformation such, for example, as would occur in a ship's structure or a propeller shaft; for detecting or measuring angular displacements; and for detecting or measuring instantaneous liquid or gaseous pressures. Many other uses will readily occur to those skilled in the art.

With the foregoing preliminary discussion of view, it is an object of my invention to provide a simple, rugged and effective electrical apparatus for detecting or measuring periodic or non-periodic mechanical displacements of either large or small magnitude.

It is another object of my invention to provide an electrical apparatus for detecting or measuring mechanical displacements wherein any change in the value of an electro-motive force incorporated in an electrical circuit of the apparatus or any change in the electron emissivity of a cathode of the space discharge device forming part of the apparatus will not affect any indication of the indicating means.

It is another and further object of my invention to provide an electrical apparatus for detecting or measuring angular displacements.

It is another and still further object of my invention to provide new and novel space discharge devices for incorporation in my detecting or measuring apparatus but which, however, are susceptible of being advantageously used in other environments.

Other objects and many of the attendant advantages of this invention will be readily appreciated as the same becomes better understood by reference to the following detailed description when considered in connection with the accompanying drawings, wherein:

Fig. 1 discloses one embodiment of my invention;

Fig. 2 discloses an alternative embodiment of my invention employing a different space discharge device and circuit arrangement;

Fig. 3 depicts a further modification of my invention differing over that of Fig. 2 principally in the employment of a grid circuit;

Fig. 4 shows another form that my invention may take and wherein a differential galvanometer is employed;

Fig. 5 depicts a still further embodiment of my invention which is especially designed for detecting or measuring angular displacements;

Fig. 6 is a sectional view taken on the line 6—6, Fig. 5;

Fig. 7 shows another modification of my apparatus employing two cathodes in the space discharge device thereof and an amplifier for amplifying any voltage differential of the bridge circuit;

Figs. 8 and 9 represent different embodiments of my invention wherein the displacement of the movable electrode or electrodes of the space discharge device is controlled by suitable external magnetic means; and Fig. 10 depicts a modification of my invention suitable for the detection or measurement of fluid pressure.

Before proceeding with a detailed description of the various embodiments of my invention it is deemed advisable at this point in the interests of clarity and in order to avoid needless repetition in the subsequent description to make certain general remarks concerning the space discharge devices and circuits employed in my apparatus. As pointed out hereinbefore, each space discharge device includes at least one cathode which serves as a source of electrons. A cursory examination of the drawings will show that all cathodes have been depicted therein as of the thermionic type, the heating thereof to insure electron emission being accomplished either directly or indirectly by a suitable source of electromotive force. I wish to emphasize in this connection, however, that I do not desire to be restricted to this type of cathode since cathodes which emit electrons due to bombardment by rapidly moving ions, electrons, or metastable atoms and are said to be secondarily emissive, or photoelectric cathodes, or cold or non-thermionic cathodes which spontaneously emit electrons due to treatment thereof by a radioactive substance, all will serve the purpose of my invention equally well. As for the thermionic cathode, it may be fabricated of a pure metal, be oxide-coated, be of a metal provided with an adsorbed monatomic film of one of the electro-positive metals or be of any other type known to the art. The envelopes of my space discharge devices which are fashioned from any of the materials known to the prior art and serve to enclose the electrodes may be evacuated to produce a high vacuum and thus insure a substantially pure electron discharge or may alternatively be provided with a suitable filling of a gas or vapor, gases or vapors, or mixtures of gases and vapors at a selected pressure or pressures to insure the desired operating characteristics.

Many of the circuits employed in various embodiments of my invention take the form of a Wheatstone bridge in which three electrodes of a space discharge device are connected to form two branches thereof, the remaining two branches being formed by two variable resistances which serve to effect a balancing of the bridge circuit prior to any detecting operation. Means responsive to the displacement to be detected or measured serve to impart movement to at least one of the said three electrodes to cause simultaneously thereamong a decrease in electrical resistance between the first and second electrodes and an increase in electrical resistance between the first and third electrodes, thus causing an unbalancing of the bridge circuit which is indicated by a suitable indicating or recording device. It is, of course, apparent that the indicating device may be suitably calibrated to indicate not only the magnitude of the displacement but also its direction.

The basic principle underlying my invention may be best appreciated by considering the embodiment disclosed in Fig. 1 of the drawings. There is shown depicted in this figure an envelope 1 of a space discharge device which includes as part thereof a flexible bellows-like metallic or glass extension 2 to the end of which is rigidly secured the anode 3 by means of the lead-in wire 4. A cathode 5, which may be of a thermionic type, is heated to an electron emissive temperature by the source of electro-motive force 6. The plate circuit of the space discharge device includes the source of electro-motive force 7 and an indicating device 8 which may be a milliammeter. The force, pressure or displacement to be detected is represented schematically by the arrow 9. A small spring and anvil 10 are arranged to return the extension 2 of the space discharge device to its initial and desired position of rest upon removal of any actuating force or pressure. It is evident that the mounting of the anode 3 is such that the application of a force or displacement 9 as shown will change the mean spacing between the anode 3 and cathode 5, this displacement of the electrodes being made possible by reason of the flexible bellows-like extension 2.

It is well-known in the vacuum tube art that with a given plate potential the space current density varies in a non-linear manner with the electrode spacing and increases rapidly as the spacing between the anode and cathode structures is reduced. This fact was first established by Child and is known as Child's law. Thus, the average internal resistance between the anode 3 and cathode 5 is a definite and reproducible function of the spacing between these electrodes, which spacing is controlled by displacing the end of the flexible extension 2 by a force or pressure 9. It is therefore evident that any change in spacing between the electrodes 3 and 5 will result in a change in space current, the indicating device 8 reading more or less depending upon whether the spacing between the electrodes is decreased or increased. Hence, any departure from a predetermined and initial reading of the milliammeter serves to detect a displacement, the magnitude of which is easily ascertainable by suitable calibration of the milliammeter or indicating means 8.

While the apparatus of Fig. 1 is an entirely operative and useful structure it does, nevertheless, possess certain inherent disadvantages. If, for example, the emissivity of the cathode 5 is in any manner impaired or the value of the electromotive force of either sources 6 or 7 changes, this will be evidenced by first order changes in the plate current indicated by the milliammeter 8. If, then, the indicating means has been previously calibrated for a fixed electron emissivity and fixed values of electromotive forces, it is evident that the indicating means 8 will now give inaccurate and false readings. In order to avoid any such difficulty as might be encountered in using the apparatus of Fig. 1, I provide different tube structures and circuit arrangements as will be pointed out hereinafter.

In Fig. 2 of the drawings there is shown a space discharge device and circuit arrangement which avoids the difficulties that may be encountered with the apparatus of Fig. 1. In this Figure 11 denotes the envelope of the space discharge device which like that of Fig. 1 has at one end thereof a flexible metallic or glass bellows-like extension 12 to which are secured and insulated from each other the two anodes 13 and 14 supported by their respective lead-in wires 15, 16. The cathode 17 which may be of a thermionic type is heated to an electron emissive temperature by the battery 18. The insulated lead-in wires 15 and 16 are connected in a bridge circuit which includes the two balancing resistances 19 and 20. It is thus seen that the bridge circuit includes four arms or branches, two of which are constituted by the resistances between the anode 13, cathode 17, and anode 14, cathode 17 with the resistances 19 and 20 heretofore mentioned forming the remaining two branches. The indicating device 21 which may be a milliammeter is placed across one diagonal of the bridge and the plate potential or source of electromotive force 22 connected across the remaining diagonal. A small spring and anvil 23 again serve to return the extension or projection 12 of the space discharge device to its initial and desired position of rest upon the removal of any actuating force. If now the end of the extension of projection 12 is displaced in any manner, such as for example by the indicated micrometer 24, the anode 13 will move toward the cathode 17 while simultaneously the anode 14 will move away from the cathode, this movement of the electrodes occurring due to the fact that the anodes 13 and 14 are rigidly secured to the end of the projection or extension 12 by means of the lead-in wires 15 and 16. The former electrode movement tends to decrease the internal resistance between the anode 13 and cathode 17 and the latter has a tendency to increase the resistance between the anode 14 and cathode 17. If, then, the bridge be balanced by a suitable adjustment of the variable resistances 19 and 20 prior to the application of a force by the micrometer 24, the bridge will now be unbalanced in both its arms by the displacement of the micrometer. It is at once evident that any unbalancing of the bridge circuit will be indicated by the milliammeter 21 and that the direction of the indication of the milliammeter 21 will indicate the direction of the displacement. The apparatus of Fig. 2 possesses important advantages over that disclosed in Fig. 1. For example, if the emission of the cathode 17 is in any manner impaired or if the values of the electromotive forces 18 and 22 change, these changes or variations in emissivity and voltage will affect the plate circuits in the bridge equally and to the first order at least. These variations or changes, however, will not be indicated by the milliammeter 21. It is thus clear that the apparatus of Fig. 2 provides a very rugged and practicable structure for indicating or measuring displacements.

The apparatus shown in Fig. 3 is a variation of that shown in Fig. 2. In this figure the envelope 25 of the space discharge device is provided at one end thereof which a flexible metal seal 26 sealed to it in any manner known to the prior art, the said seal 26 having secured thereto the tubular metallic member 27 supporting the anode leads 28 and 29. The anode lead 28, as shown, supports the anode 30 and is hermetically sealed to and insulated from the tubular member 27 by means of the insulating plug 31. The metallic tubular member 27 besides serving to impart movement to the anodes 30 and 32 serves also as a current conductor. The cathode 33, which may be of a thermionic type, is heated to an electron emissive temperature by the battery 34 and is surrounded by a grid 35 which is connected to a suitable source of biasing voltage 36. The space discharge device 25 as in the preceding figure is connected in a bridge circuit to form two branches thereof, the remaining two branches being constituted by the variable resistances 37 and 38. Any convenient source of electromotive force 39 serves to supply the current for energizing the bridge circuit. The tubular member 27 with the anodes 30 and 32 rigidly secured thereto is moved by any means such as the indicated micrometer 40. An oscillographic element 41 is shown in the bridge circuit to emphasize the fact that periodic or rapid displacements of the small projecting tube may be indicated and recorded by photographic or other methods. The essential difference of the apparatus of Fig. 3 over that of Fig. 2 resides in the employement of a grid structure 35 and a biasing battery 36. This arrangement can be made somewhat more sensitive than that of Fig. 2 and balancing of the bridge is somewhat more convenient. The apparatus of Fig. 3, however, also employs the fundamental principle of a change in plate resistance attending the simultaneous movement of the anodes 30 and 32 as a result of the application of a pressure or force to the tubular member 27.

Fig. 4 shows another modification of my apparatus wherein 42 denotes the envelope enclosing the anodes 43, 44 and the thermionic cathode 45 which is heated to an electron emissive temperature by the battery 46. A tubular member 47 supports the anodes 43 and 44 for movement within the envelope and is identical in construction and mounting with that shown in Fig. 3 of the drawings. It is to be clearly understood that the space discharge device of Fig. 4 is identical in construction and operation with that of Fig. 3 except that the grid has been omitted. A differential galvanometer 48 with an appropriate balancing resistance 49 is connected in the plate or bridge circuit of the space discharge device, a source of electromotive force 50 serving to energize the circuit. The windings 51 and 52 of the differential galvanometer are, of course, connected so that they annul each other and if the current increases in one coil and decreases in the other, the deflection will be increased due to both causes. The balancing resistance 49 connected across the coil 51 permits the employment of the differential galvanometer as a null instrument. Again, a spring and anvil are schematically represented at 53 to return the tubular member 47 to its initial and desired position of rest upon the removal of any actuating force. Anvils 54 and 55 and a test object 56 suggest one use of the apparatus which is applicable to the modifications previously described and to be described hereinafter. Thus, for example, if the test object 56 is a standard test piece and is introduced between the anvils 54 and 55 as shown the bridge may be balanced so that the galvanometer 48 will read some predetermined value. Then as object 56 is removed and comparison objects are introduced in place thereof, the galvanometer or indicator 48 will read more or less than the value established for the standard test piece, thus showing that the object under test is greater or less in diameter than the standard. The galvanometer 48 is readily calibrated and standardized with the result that the exact amount of departure of any test piece from that of the standard can be easily and quickly determined.

Figs. 5 and 6 illustrate a still further modification of my apparatus which is especially designed for indicating or measuring angular displacements. In this embodiment 57 designates the grid structure surrounding the cathode 58 and as shown consists of a plurality of conductors 59 which are arranged more or less parallel to the electron emissive cathode. The anode or plate structures 60 and 61 are also each made of plurality of conductors which are parallel to those of the grid and substantially parallel to the cathode and are so arranged that when the conductors of the anode 60 (see Fig. 6) are behind the grid conductors and thus substantially fully shielded from the cathode, the conductors of the anode 61 are substantially fully exposed to the cathode. The envelope of the space discharge device includes an insulating portion 62 to which is sealed a metallic portion 63 having a part thereof terminating at 64 which is flexible and to which twisting or torsional movements may be imparted. Rigidly secured to the part or extension 64 is a tubular metallic member 65 in which the lead-in wires of the anodes 60 and 61 are insulatingly supported and hermetically sealed by the insulating plug 66. It is evident that any angular movement of the extension 64 will result in rotary or angular movement of the anodes 60 and 61. A suitable source of electromotive force 67 serves to bias the grid while the remaining electrodes of the space discharge device are connected in a bridge circuit which includes the variable resistances 68 and 69 and the voltage source 70 for energizing the same. As in the previous embodiments of my invention a suitable indicating device 71 is provided for detecting any differential voltage in the bridge circuit. The manner of operation of the apparatus in Fig. 5 is believed to be clear. Thus if any torsional movement is imparted to the flexible extension 64 by any means whatsoever rotary movement of the anodes 60 and 61 will result. Assuming that the initial positions of the anodes 60 and 61 are shown in Fig. 6 if the movement is in the direction indicated by the arrow the conductors of the anode 60 will be exposed more and more to the cathode 58 while simultaneously the conductors of the anode 61 will be moved progressively from their exposed positions to the cathode to positions where they are shielded by the grid conductors. If the bridge be balanced prior to the initiation of any movement of it is clear that the angular displacement of the anode 60 will result in an increased current flow thereto while the current to the anode 61 is decreased. Since movement of the anodes causes a variation in the tube resistances with attendant variation of currents in the bridge circuit it is evident that the bridge is now unbalanced and that any differential voltage thus caused is indicated by the indicating device 71. In this manner it is possible to indicate or measure angular displacements.

In the modification of Fig. 7, 72 indicates the envelope of the space discharge device to which is sealed the flexible metallic cap 73 for movably mounting the anode 74. The anode as shown is interposed between two cathodes 75 and 76 of the indirectly heated type which are heated to an electron emissive temperature by the resistance units 77 and 78 energized by the battery 79. A small spring and anvil 80 serve to return the anode to its initial and desired position of rest, movement being imparted to the anode, for example, by the test piece 81 which is shown interposed between the anvil 82 and micrometer 83. The space discharge device of Fig. 7 has certain advantages over those previously described in that it is not necessary to insulate two moving lead-in wires for the anodes and as in the previous embodiments is connected in a bridge circuit which includes the variable resistances 84 and 85 and a suitable source of electromotive force 86. The apparatus depicted in Fig. 7, however, differs over those previously described in that any differential voltage produced in one diagonal of the bridge circuit is amplified, this being accomplished by connecting parts of the bridge circuit as shown to grid 86 and an indirectly heated cathode 87 of an amplifier tube 88. This amplifier tube in turn forms one branch of a second or auxiliary bridge circuit, the remaining three branches of which are constituted by the variable resistances 89, 90 and 91 and energized by a suitable source of electromotive force 92. This scheme insures amplification of any differential voltage in one diagonal of the first bridge circuit which is indicated or recorded by any proper indicating means such as, for example, an oscillograph 93. It is to be emphasized that this arrangement for amplifying any differential voltage may be employed in any other modification of my invention and that any convenient number of stages may be employed.

A further modification of my invention is shown in Fig. 8 in which the anodes 94 and 95 are made of a magnetic material which can be magnetized by induction or may be permanent magnets with poles as indicated. The anodes are secured to relatively flexible lead-in wires 96 and 97, a cathode 98, which may be of a thermionic type, being interposed between the said anodes. The electrodes of the space discharge device are connected in a bridge circuit to form two branches thereof, the remaining two branches being formed by the variable resistances 99 and 100 and energized by a suitable source of electromotive force 101. As in the previous modifications an indicating device 102 serves to indicate or measure any displacement of the anodes 94 and 95 with respect to the cathode 98. The position of the anodes within the space discharge device is controlled by any suitable external magnetic means such as, for example, a permanent magnet 103. The position of the magnet 103 is controlled by the displacement which it is desired to detect or measure, it being apparent that the magnet may be moved in a desired manner. Thus, for example, rotation of the magnet 103 about its axis of symmetry will produce a displacement of the magnetic anodes within the tube in such a way that angular displacements may be readily indicated on the milliammeter or indicating device 102.

Fig. 9 illustrates another form which my apparatus may take. In this embodiment two thermionic cathodes are employed, one of which is designated in general by the numeral 104 and made in two portions 104' and 104'', the remaining cathode 105 being similarly constructed and consisting of the parts 105' and 105''. The cathodes 104 and 105 are heated to an electron emissive temperature by the respective sources of electromotive force 106 and 107. The anode is shown at 108 as a magnetized body and is interposed and mounted for rotation between the cathodes. The space discharge device as in the previous embodiments is connected in a bridge circuit to form two branches thereof, the remaining two branches of which are constituted by the variable resistances 109 and 110 which are energized by the source of electromotive force 111. Any differential voltage in a diagonal of the bridge is indicated by a suitable indicating device 112. As in the modification of Fig. 8 the position of the anode 108 is controlled by any suitable external magnetic means such as, for example, the magnet 113, the position of the said anode with respect to a selected initial position being indicated by the indicating device 112.

One important application of my apparatus is to the measurement of instantaneous fluid pressures such for example as the changes in pressure in the cylinders of a Diesel engine when it is in operation. Fluid pressures of any character may be conveniently indicated or measured by the apparatus shown in Fig. 10 of the drawings. In this embodiment 114 designates a vessel of any suitable insulating material apertured at points 115 and 116 and transversely of which there extend two flexible partitions 117, 118 which may be of metal to thus provide upper and lower chambers 119, 120 and an intermediate hermetically sealed chamber 121. Anodes 122 and 123 are electrically connected to and supported by the respective diaphragms or partitions 117, 118 a thermionic cathode 124 being interposed between the anodes for cooperation therewith. As in many of the preceding embodiments the electrodes within the hermetically sealed chamber 121 are connected to form two branches of a bridge circuit of which the remaining two branches are constituted by the variable resistances 125 and 126. Any suitable indicating device 127 serves to indicate any differential voltage in the bridge circuit which is energized by the source of electromotive force 128. The chambers 119 and 120 serve as receptacles for the fluid the pressure of which is to control the displacements of the diaphragms 117 and 118. It is evident that any pressure applied to the diaphragm 117 will cause a displacement thereof thus decreasing the spacing between the anode 122 and the cathode 124 with attendant unbalancing of the bridge circuit as evidenced by an indication of the indicating means 127. The indication of the indicating means 127 will of course be proportional to the displacement of the diaphragm 117. The diaphragm 118 which is electrically connected in the bridge circuit and to the anode 123 is introduced for two reasons. It serves as a means for balancing out irregularities in emission of the cathode or any voltage variation in the sources of electromotive force but is primarily intended to correct for any changes in barometric pressure. As pointed out hereinbefore, if the diaphragm 117 is subjected to fluid pressure the displacement of the diaphragm will be proportional to the pressure exerted upon it. If, for example, the apparatus is employed as a fuel gauge in aircraft, operations at high altitudes will reduce the displacement of the diaphragm 117 and in order for the indicating device 127 to read the proper pressure-head the anode 123 must be displaced a distance equal to the distance displaced by the anode 122 due to the increased altitude. To insure a displacement of the anode 123 and hence a correct and accurate reading of the indicating device 127 the diaphragm 118 is provided. It is clear that the apparatus of Fig. 10 may be used to indicate differential pressure.

All novel features of my system or apparatus as a whole are claimed in this application, the features of novelty of my space discharge devices, however, being claimed in application Serial Number 114,111 filed concurrently herewith.

According to the provision of the patent statutes I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. An apparatus for detecting mechanical displacements comprising in combination an envelope enclosing at least three electrodes, at least one of which is electron emissive and at least one of which is movable, means responsive to the mechanical displacement to be detected for imparting movement to at least the movable electrode, and means unaffected by any change in electron emissivity for indicating any detected displacement.

2. An apparatus for detecting mechanical displacements comprising in combination an envelope enclosing two spaced anodes and an electron emissive cathode interposed therebetween, at least one of said anodes being mounted for movement relatively to the envelope, means responsive to the mechanical displacement to be detected for imparting movement to at least the movable anode, and means unaffected by any change in electron emissivity for indicating any detected displacement.

3. An apparatus for detecting angular displacements comprising in combination an envelope enclosing a cathode, grid and two anodes, means responsive to the angular displacement to be detected for imparting rotational movement to said anodes, and means associated with said electrodes for indicating any detected displacement.

4. An apparatus for detecting angular displacements comprising in combination an envelope enclosing a cathode, grid and two anodes, the said grid and anodes each being formed of a plurality of longitudinally extending conductors which are arranged such that when the conductors of one anode are substantially fully shielded by the grid conductors from the cathode the conductors of the other anode are substantially fully exposed to the cathode, means responsive to the angular displacement to be detected for imparting rotational movement to said anodes to thereby vary the positions of the anode conductors with respect to the grid conductors, a bridge circuit in which the aforementioned cathode and anodes are connected to form two branches thereof, a grid circuit for suitably biasing the grid, and means for indicating any detected displacement.

5. An apparatus for detecting displacements comprising in combination an envelope enclosing two spaced electron emissive cathodes and an anode interposed therebetween, means responsive to the displacement to be detected for imparting movement to said anode to cause simultaneously a decrease in spacing between the said anode and first cathode and an increase in spacing between the said anode and the second cathode, a bridge circuit in which the aforementioned anode and cathodes are connected, and means for indicating any detected displacement.

ROSS GUNN.